Figure 1:
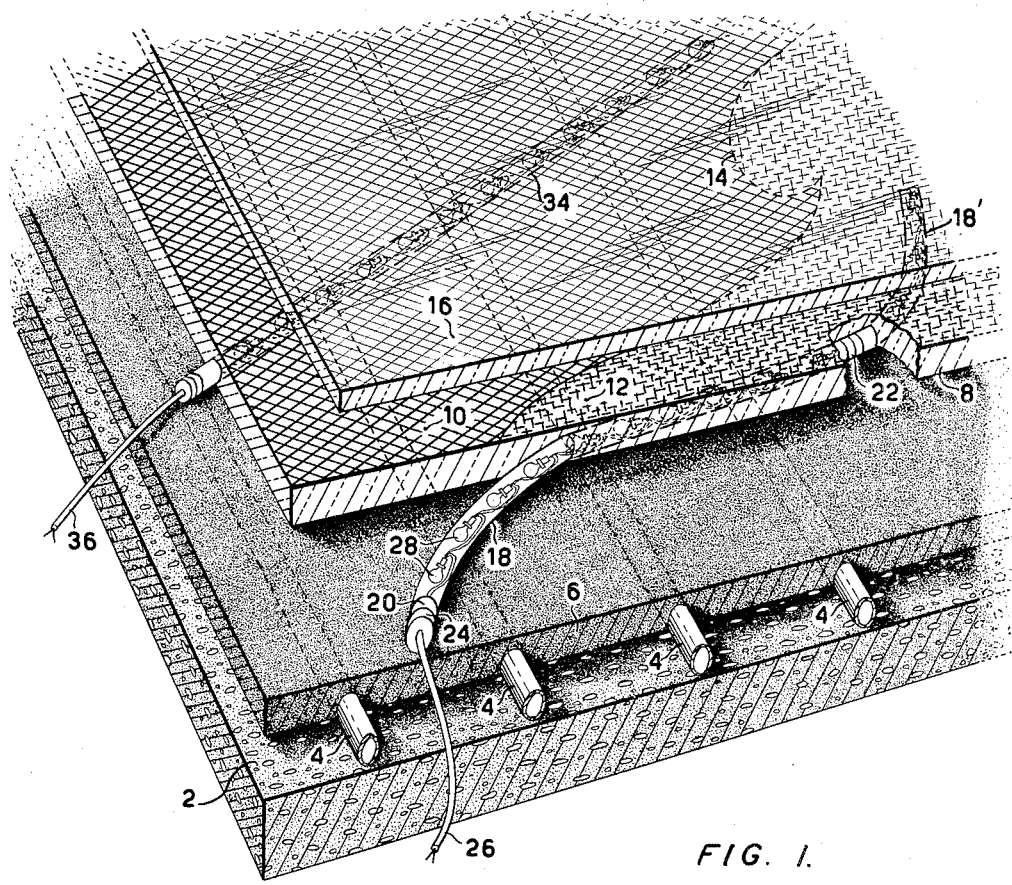

March 4, 1952     O. F. JOHNSON     2,587,855

ILLUMINATION FOR ICE SKATING RINKS

Filed Feb. 25, 1949

INVENTOR.
OSCAR F. JOHNSON
BY

ATTORNEYS

Patented Mar. 4, 1952

2,587,855

UNITED STATES PATENT OFFICE 2,587,855

ILLUMINATION FOR ICE SKATING RINKS

Oscar F. Johnson, San Francisco, Calif.

Application February 25, 1949, Serial No. 78,245

7 Claims. (Cl. 62—12)

This invention relates to an illuminating system for in ice skating rink particularly designed to provide illumination of the ice surface from beneath that surface.

In ice skating shows and pageants quite effective and beautiful results may be secured by providing sources of illumination below the ice surface, it being possible to secure in this fashion patterns or areas of illumination, for example, delimiting the boundaries of skating routines and particularly providing quite unusual effects if lighting from above the surface of the ice is dimmed or interrupted. However, the securing of effective subsurface illumination involves various difficulties. It is, for example, impractical, except in the case of a very small area, to provide a transparent glass floor with the lights located beneath the floor and with ice formed above the glass particularly since the refrigerating piping detracts from the effectiveness of the illumination unless it is made of transparent tubing. It will be obvious that the resulting structure required is very expensive even if confined to quite small areas.

Actually, for effective ice shows, large rinks are required and these are provided in various localities in auditoriums which are used for many purposes. For example, during a year, such an auditorium may accommodate boxing, wrestling, basketball games, etc., involving, at other times, the use of an ice floor for ice hockey games and for skating including, in the latter case, spectacular shows. It will be evident, therefore, that a satisfactory illuminating system must be consistent with the requirements for such an auditorium, or open-air field, and structure will not be permissible unless it is consistent with all of the numerous requirements of sporting and other events. Generally speaking, the foundation floors are of two types: in one case, concrete floors are provided in which is embedded the refrigerating piping required to freeze an ice surface; in other cases, a concrete floor is provided and the refrigerating piping is laid on this floor generally being submerged in a layer of sand, over and into which water is flowed to be frozen to provide a skating surface.

Attempts have been made to provide illumination of such rinks through the use of neon lights but various troubles have been encountered due to the fact that the glass tubing of such lights is easily broken by expansion and contraction occurring during freezing and thawing and such lights can only be removed after complete thawing has been effected. An impractical aspect of this is that shows of the type referred to may be scheduled to close after a Saturday evening performance to reopen in another city on the following Monday. Unless the thawing of the ice is greatly accelerated by the passage of hot water or steam through the refrigerating piping, in itself a costly procedure, the lighting fixtures cannot be recovered sufficiently rapidly to accompany the other props of the show in the journey to the next locality.

Furthermore, neon lighting requires relatively high voltage and troubles are encountered due to leakage which is, of course, promoted by the presence of water even in the form of ice since, if local heating occurs, melting will ensue.

It is one object of the present invention to provide an effective system of illumination which overcomes the difficulties mentioned above. In brief, the illumination is provided by strings of incandescent bulbs located in sealed plastic tubing which may be either rigid or flexible. Tubes of these types may be connected through ordinary waterproof electric cables such as are used for outdoor wiring to outlets at the sides of the rinks and thence through conventional dimmer boards and switches for the control of the illumination. The tubes so provided are put in place prior to the flooding and freezing of the surface and so long as the illumination is confined to relatively short periods, as is generally desirable in any event, the heat generated will not be sufficient to produce any undesirable degree of thawing of the ice surface. Alternatively, the ice surface may be first formed and the tubes may be located on the surface of the ice and the lamps therein illuminated. The heat generated will rapidly melt the ice adjacent to the tubes so that they will sink into the surface, and subsequent freezing when the lights are out will repair the surface to a smooth condition.

A particular advantage of the invention is the ease and rapidity with which the tubes may be removed following a closing show. Immediately following the end of the show, the current may be turned on and in a relatively short time the ice surrounding the tubes will be melted and they may be pulled up and disconnected from their lead wires and removed. The lead wires may be left in the ice and abandoned since they are relatively inexpensive, these being removed eventually after thawing is completed.

Figure 2:
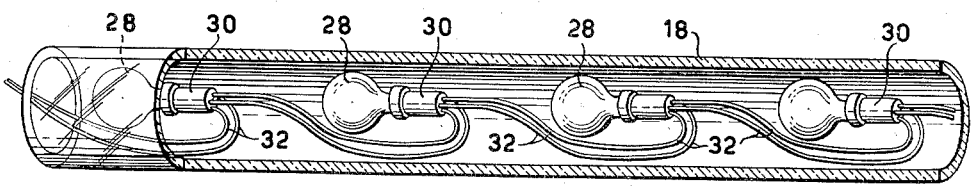

The general objects of the invention will be apparent from the foregoing. These and other objects particularly relating to details of construction and procedure will become apparent from the following description, read in conjunction with the accompanying drawing, in which:

Figure 1 is a sectioned perspective illustrating a preferred application of the invention in practical use; and Figure 2 is a fragmentary axial section illustrating the disposition of a series of bulbs within transparent or translucent plastic tubes.

There is indicated at 2 the concrete floor of an auditorium in which are located the pipes 4 for the circulation of refrigerant. These pipes are illustrated as covered by a layer of sand indicated at 6 to provide a substantially level foundation over which the ice surface may be provided. It will be evident that the invention will be equally applicable to situations in which the refrigerating piping may be embedded in the concrete.

Passing for the moment the matter of illumination, it has been customary to provide a rink by first freezing a layer 8 of ice which is then painted, sometimes in contrasting colors, with translucent paint indicated at 10 and 12 with the areas separated by lines of demarcation such as indicated at 14 to provide a basic design. This painting not only serves for the purpose of decoration by providing designs in contrasting colors but is, in any event, generally necessary, even if only a single color is laid over the entire area to secure a pleasing appearance, since, otherwise, due to its semitransparency, the ice will appear dirty and unattractive by virtue of the underlying surface. Following the painting of the layer 8, water is run onto the painted surface and frozen to provide a thin surface layer 16 which provides a protective layer, the surface of which may be refinished between shows to secure the desirable smooth skating surface.

The conventional surface so far described has associated with it the novel illuminating means. As indicated in Figures 1 and 2, this may comprise a tube 18 of flexible transparent or translucent plastic, which will be hereinafter referred to as "light-transmitting plastic," formed, for example, of vinylite plastic or one of the other numerous well known plastics of this same general type. Strung through such tubing is a series of bulbs 28 which may be of miniature type supported by sockets 30 and interconnected by wiring indicated at 32 to provide a parallel arrangement of the bulbs with respect to the power line. As will be evident from Figure 2, a string of bulbs may be readily made up and threaded through even a very long tube of the type described. Highly satisfactory illumination has been produced by providing the bulbs at intervals of approximately two inches, under which circumstances the final illumination as viewed through the ice and paint appears to be a substantially continuous glowing line. Following the stringing of the bulbs, the ends of the tube may be plugged as indicated at 20 and provided with conventional connectors, the details of which need not be illustrated, for connection to cooperating connectors 24 carried by insulated lead cables 46 connected to suitable outlets providing current under control of conventional switches and dimmers. The tubes such as 18 may be coupled together end to end through coupling members 22 as indicated in the pair 18 and 18' in Figure 1. The connectors involved may be of the usual types utilized for outdoor wiring exposed to rain. Under ordinary conditions of use of city water, the water is of sufficiently high resistivity that even if it penetrates the connectors to some extent the short-circuiting effect will be negligible. In particular, however, ice offers a quite high resistivity and no difficulties are experienced utilizing the conventional supplies at 110 volts.

Before proceeding with a description of the placement of the tubes, reference may be made to the rigid tube indicated at 34 also formed of plastic and containing a group of bulbs connected to the external lead cable 36.

The placement of the tubes may be effected in various fashions. They may be located at suitable predetermined arrays upon the sand surface such as 6 or upon the concrete surface if the refrigerating piping is embedded in the concrete, prior to the flooding of the surface to provide the ice layer 8. On the other hand, an alternative procedure is sometimes desirable, particularly when the arrival of the props is not sufficiently long prior to the opening show of a series so that it is desirable that the layer 8 be frozen before the show arrives. In such case, the lead wires 26 and their connectors 24 may be placed before the arrival of the show and frozen in the ice. When the show arrives with the tubes such as 18 and 34, the connectors 24 may be chipped out of the ice to the extent necessary and connected with the tubes which may be then placed in desired formation on the surface of the ice. By then turning on the current, the heat of the bulbs will melt the ice locally and the tubes will sink therein in their desired positions. Following this, refrigeration is continued and the surface will close over the tubes. The paint may then be applied, or if the painting was previously done, the disturbed portions may then be repaired and finally there may be frozen over the paint the top layer of ice 16.

Following the last show of a series, the current may be again turned on and the bulbs illuminated for a sufficient time for their heat to melt the ice locally, whereupon they may be easily pulled up and recovered for transportation to the next location, the lead wires being either abandoned or recovered later after complete thawing takes place.

It will be clear from the foregoing that practical subsurface illumination is provided in a simple and inexpensive fashion without any of the drawbacks of other systems indicated above. The plastic tubes, even if of rigid type, are sufficiently resilient to withstand without cracking the expansions and contractions involved in heating and thawing. The same set of tubes may also be used repeatedly, and, if they are flexible, they may be arranged in many patterns being associated variously with relatively rigid tubes which may also be quite arbitrarily placed to secure designs fitting in with the routines of the performers. While considerable heat is generated during the illumination, there is generally ample refrigeration so that the illumination may be continued through the time of a normal routine without any effect upon the smoothness or continuity of the top surface of ice. If desired, bulbs of different colors may be provided or the tubes may be made of colored plastics to secure any desired effects. White or clear bulbs may, of course, be used with the colored effects obtained solely by virtue of the contrasting paints in areas such as indicated at 10 and 12. When these paints are translucent, the individual bulbs will not be discernible as such but rather there will appear to be continuous lines of light following the contours of the tubes.

What I claim and desire to protect by Letters Patent is:

1. An ice skating rink including a floor, refrigerating means associated with said floor, a layer of ice on said floor, and illuminating means embedded within and substantially surrounded by said ice, said illuminating means comprising a light-transmitting plastic tube containing at least one incandescent source of light.

2. An ice skating rink including a floor, refrigerating means associated with said floor, a layer of ice on said floor, and illuminating means embedded within and substantially surrounded by said ice, said illuminating means comprising a light-transmitting plastic tube containing a series of light bulbs.

3. An ice skating rink including a floor, refrigerating means associated with said floor, a layer of ice on said floor, and illuminating means embedded within and substantially surrounded by said ice, said illuminating means comprising a light-transmitting plastic tube containing a series of incandescent light bulbs.

4. An ice skating rink including a floor, refrigerating means associated with said floor, a layer of ice on said floor, and illuminating means embedded within and substantially surrounded by said ice, said illuminating means comprising a light-transmitting flexible plastic tube containing at least one incandescent source of light.

5. An ice skating rink including a floor, refrigerating means associated with said floor, a layer of ice on said floor, and illuminating means embedded within and substantially surrounded by said ice, said illuminating means comprising a light-transmitting flexible plastic tube containing a series of light bulbs.

6. An ice skating rink including a floor, refrigerating means associated with said floor, a layer of ice on said floor, and illuminating means embedded within and substantially surrounded by said ice, said illuminating means comprising a light-transmitting flexible plastic tube containing a series of incandescent light bulbs.

7. The method of forming an ice skating rink comprising freezing water on a floor to provide a layer of ice, locating on the layer of ice a light-transmitting plastic tube containing at least one incandescent source of light, illuminating said source thereby to provide heat to melt the ice locally to permit the tube to sink thereinto, and then refreezing the water over said tube to embed the tube within ice.

OSCAR F. JOHNSON.

REFERENCES CITED

The following references are of record in the file of this patent:

UNITED STATES PATENTS

| Number | Name | Date |
| --- | --- | --- |
| 714,233 | Plancon | Nov. 25, 1902 |
| 1,839,479 | Hartman | Jan. 5, 1932 |
| 1,923,807 | Asch | Aug. 22, 1933 |
| 2,216,220 | Baker | Oct. 1, 1940 |
| 2,424,064 | Stegeman | July 15, 1947 |
| 2,457,619 | Yocum | Dec. 28, 1948 |